United States Patent [19]

Hennig

[11] Patent Number: 5,343,300
[45] Date of Patent: Aug. 30, 1994

[54] APPARATUS FOR PROVIDING TV PROGRAM INFORMATION

[75] Inventor: Bruno E. Hennig, Zurich, Switzerland

[73] Assignee: RCA Thomson Licensing Corporation, Princeton, N.J.

[21] Appl. No.: 801,775

[22] Filed: Nov. 27, 1991

[51] Int. Cl.⁵ .............................................. H04N 7/087
[52] U.S. Cl. ..................... 348/478; 358/335; 348/473
[58] Field of Search ............... 358/142, 141, 147, 146, 358/335; 360/33.1, 69; H04N 7/08, 7/087, 7/00

[56] References Cited

U.S. PATENT DOCUMENTS 4,635,121  1/1987  Hoffman et al. .................. 358/188
4,706,121  11/1987 Young ................................ 358/142

FOREIGN PATENT DOCUMENTS 0290000  11/1988  European Pat. Off. .
0337336  10/1989  European Pat. Off. .
0393555  10/1990  European Pat. Off. .
0393556  10/1990  European Pat. Off. .
0447968   9/1991  European Pat. Off. .
3527939   6/1985  Fed. Rep. of Germany .
0002082   5/1985  PCT Int'l Appl. .
0010351   9/1990  PCT Int'l Appl. .

OTHER PUBLICATIONS

"Enhanced computer-controlled teletext circuit SAA5243" by J. Kinghorn, Electronic Components & Applications 8 (1988) No. 3, Einchoven, The Netherlands, pp. 175-185.

"Das digitale Fernsehkennungssytem ZPS" by H. Eckhard Krüger, pp. 368-376 (translation attached).

Primary Examiner—James J. Groody
Assistant Examiner—David E. Harvey
Attorney, Agent, or Firm—Joseph S. Tripoli; Peter M. Emanuel; Thomas F. Lenihan

[57] ABSTRACT

A known system derives information from the VPS- and Teletext signals and displays the title of the current program and the network name on screen for a few seconds, each time a new channel is selected. The VPS- and Teletext signals contain more program-related information than mentioned above. The present invention concerns deriving the end-time and/or the remaining duration of the current program as well as the starting-time of the next program for display on-screen.

8 Claims, 4 Drawing Sheets

```
P402    402    CH-TEXT                    15.02.90      14:25:03
SRG     TV-DRS         THURSDAY           15. FEBRUARY 1990
                                       [24101] [150290] [CF]
08.30   [0830]  EDUCATIONAL TELEVISION: GEOGRAPHY
09.20   [0920]  JOURNEY THROUGH OUR BODIES
09.50   [2500]  END / PAUSE
12.55   [1255]  NEWS
13.00   [1300]  A HOME FOR ANIMALS
13.55   [1355]  TIME MIRROR: EMPEROR OF THE GOLDEN TRIANGLE
14.45   [1445]  MTV
15.40
```

SINGLE TIME FORMAT

FIG. 1a

```
P302    302    ARD / ZDF                  15.2.90       14.50.17
ZDF            AFTERNOON PROGRAM          15. FEBRUARY 1990
                                       [10101] [150290] [3A]
13.45 - 14.15   TRAVEL IMAGES FROM THE DDR
[1345]

14.15 - 15.15   GREAT PIANISTS: VLADIMIR HOROWITZ
[1415]

16.00 - 16.05   TODAY
[1600]

17.00 - 17.45   RENE KOLLO : I LIKE TO INVITE GUESTS
[1700]

17.45 - 18.00   TELE-ILLUSTRATED, SUBSEQUENTLY REGIONAL MIRROR
[1745]

18.00 - 18.05   TODAY
[1800]
```

DOUBLE TIME FORMAT

FIG. 1b

☐ CONCEALED VPT DATA

```
P501    501    CH-TXT                     15.02.90      14:55:35
SRG     TV-RSR         THURSDAY           15. FEBRUARY 1990
[24107] [150290] [81] [1000] [1015] [1400]
[1600] [1700] [1800] [1930]
10.00                  EARLY NEWS
10.15 - 12.15          EARLY MOVIE
14.00                  NOON NEWS
14.15                  NOON MOVIE
16.00                  PROGRAM PREVIEW
17.00 - 17.15          EVENING NEWS
18.00 - 18.45          SERIES
19.30 - 20.00          NEWS OF THE DAY
```

BOTH TIME FORMATS
WITH BLOCK
REPRSENTATION OF
CONCEALED VPT-DATA

FIG. 1c

ROLLING PAGES

DIFFERENT PAGES WITH SUBSEQUENT PAGE NUMBERS

DIFFERENT PAGES WITH SUBSEQUENT PAGE NUMBERS, WHERE EACH PAGE CAN BE A ROLLING PAGE

APPARATUS FOR PROVIDING TV PROGRAM INFORMATION

FIELD OF THE INVENTION

The present invention relates to the field of television receivers incorporating teletext decoders.

BACKGROUND OF THE INVENTION

The VPS- and Teletext signals contain useful program-related information which can be displayed to the TV viewer. European Patent Application EP 89106255.6 describes the required hardware and software extensions to realize suitable signal processing to find this information and display the title of the current program and the name of the broadcasting station. A TV set, equipped with a teletext decoder, need only be supplemented with a VPS-decoder and some additional software in the teletext controller to provide these useful features.

In the meantime the realization of this information display became increasingly attractive as new teletext-dataslicers with built-in VPS-decoders became available. Thus, such a system can be implemented into TV receivers without any additional hardware expenses, when using this new dataslicer (such as an SDA 5645) for the teletext-decoder.

In addition to the title of the current program and the name of the broadcasting station, some supplementary program-related information is contained in the VPS- and Teletext signals. Currently available decoders cannot retrieve this supplementary program-related information.

SUMMARY OF THE INVENTION

The present invention describes how to obtain, from the supplementary information, the end-time and/or the remaining duration of the current program as well as the starting-time of the next program, and how to display this information on-screen. It is herein recognized that the system described in EP 89106255.6 may be modified in software to realize these useful supplementary features.

BRIEF DESCRIPTION OF THE DRAWING

FIG. 1a, 1b, and 1c, show examples of teletext program schedule pages as known from the prior art.

DETAILED DESCRIPTION OF THE EMBODIMENT

The required program related information is obtained from the VPT-pages in teletext. (VPT Videorecorder Programming by Teletext). VPT-pages are TV-program schedule pages where all the data required for VCR programming are inserted and explicitly characterized by specific data formats. These data correspond to the VPS-data, transmitted on line 16.

It is therefore possible for a microcomputer to find the VPT-page containing the information related to the current program, by correlating the actual VPS-code with the incoming TXT-pages. The required procedures and the solution of the problem caused by the time constraints of the data transfer bus (IIC-bus) were presented in the above-mentioned European patent application EP 89106255.6.

The display of on-air time information is based on these VPT-pages. The well-defined assignments of the VPT-data allow one to derive the required information for display from these pages as soon as they are found.

The display of program-time information is based on the following definitions. The given explanations of the used terms are important for better understanding of the descriptions.

On the VPT program pages each announced program has explicitly assigned to it the following data with their own characteristic format:

On-air time:
    The on-air time is represented in single-time format (xx.xx) or in double-time format (xx.xx.-yy.yy). The later format defines both starting and end time.

Title of the program:
    The title uses one or more teletext rows.

VPS-time:
    The VPS-time format differs from the single-time format, in that it has no dot character between the hours and minutes (xxxx).

The most important difference between the VPS-time and the starting time is that the former is not changed in case of changes in the program schedule, while the latter matches the scheduled real on-air time.

Assignment of starting-time and end-time:

On-air time in single time format:
    The end-time of a program is given by the starting-time of the following program on the VPT page. Otherwise, when there is no following program 6n that page, an additional time information, in single time format without a title must be present for this purpose, as shown in FIG. 1a.

A starting-time with a VPS time 2500 is used to characterize a transmission pause. It also represents therefore the end-time of the previous program.

On-air time in double time format:
    The end-time is explicitly contained in the double-time format, as shown in FIG. 1b.

Assignment of on-air time and title:
    The arrangement of on-air time (starting-time) and the corresponding title is fixed; first the on-air time and then the corresponding title. The end of a title is marked by the following starting time.

Assignment of on-air time and VPS-time:
    The arrangement of the VPS-times must correspond to the sequence of the announced programs (represented by their starting-times) on the VPT-page. (This also allows the block representation as shown in FIG. 1c).

Figure 2:
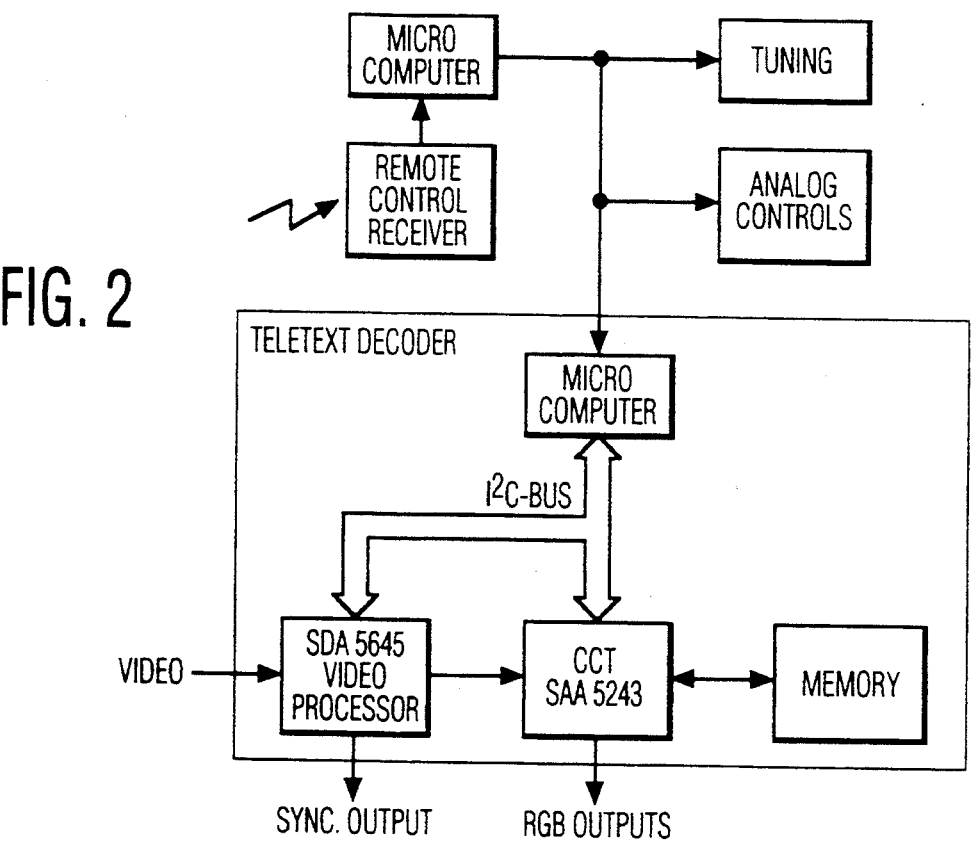
FIG. 2 is a block diagram of system hardware suitable for practicing the invention.

The system configuration shown in FIG. 2 is the same as in EP 89106255.6, with the exception of the video processor (data-slicer) SAA 5231. This is replaced by the video processor SDA 5645, which incorporates a VPS decoder, thus eliminating the separate VPS decoder previously used.

When the TV set is turned on or a new channel is selected, the microcomputer acts as described in EP 89106255.6. It first has to read the VPS code of the current program from the VPS-decoder. Then the teletext page that includes the actual TV program schedule (VPT page) has to be found in the incoming Teletext datastream. For this reason the same procedure has to be used as described in EP 89106255.6. When the corresponding page is found, the microcomputer also determines which row contains the starting-time and the first line of the title of the current program.

Next the end-time has to be found: This is trivial if the double-time format is used. Otherwise the microcomputer has to search for the starting-time of the following program, the starting-time of a transmission pause, or the next time format without a title should there be no following program on that page. A similar algorithm as used in EP 89106255.6 is employed to determine the number of lines of the title of the current program.

To display the remaining duration of the current program in addition to (or instead of) the end-time, the rolling time of the header is read and subtracted from the end-time.

Finally, the starting-time of the next program has to be found:

If the end-time of the current program was not obtained from the starting-time of the following program, the microcomputer has to search for this starting-time. Some complications occur if the following program is not listed on the same page. This case has to be considered as the TV program schedule of one day is usually distributed over several pages.

Figure 3A:
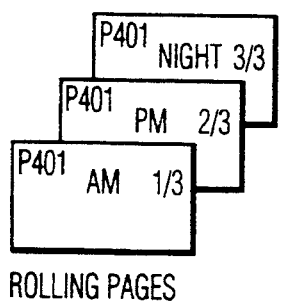
FIGS. 3a, 3b, and 3c show examples of distributions over several pages of a television program schedule for a single day.

Three different ways of distributing the TV program schedule on different pages exist:

Case 1
on rolling pages with the same page number as shown in FIG. 3a

Figure 3B:
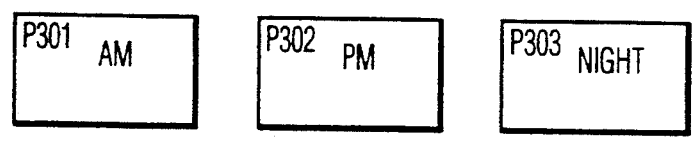

Case 2
on different pages with subsequent page numbers as shown in FIG. 3b

Figure 3C:
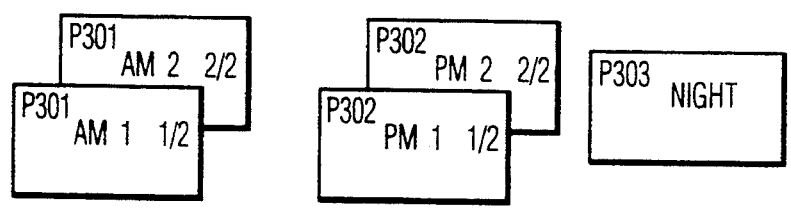

Case 3
on different pages with subsequent page numbers where each page can be a rolling page as shown in FIG. 3c.

Figure 4:
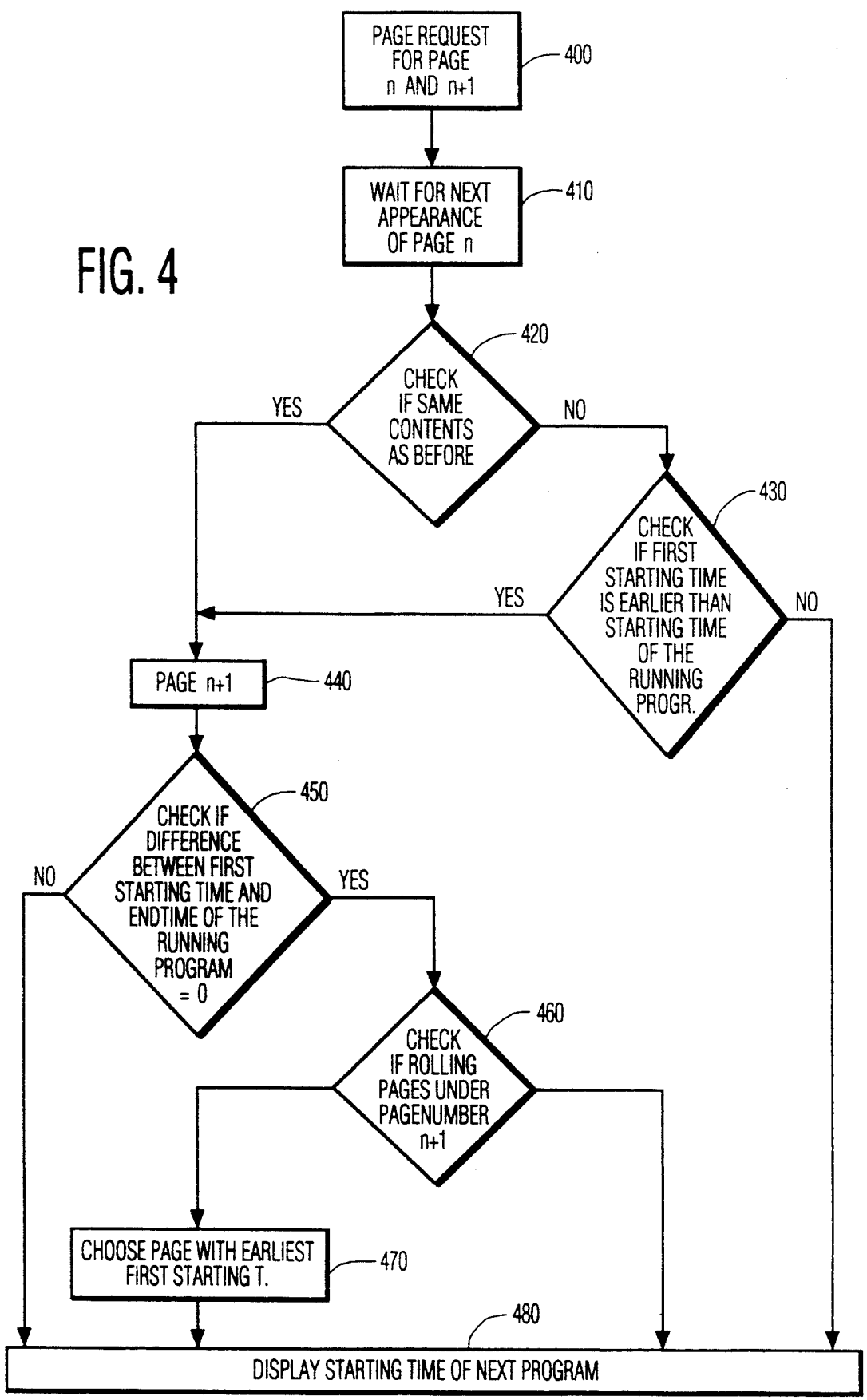
FIG. 4 is a flowchart showing the relevant portion of the control program for the microcomputer of FIG. 2.

The present invention will be described with reference to the flowchart of FIG. 4. It is not trivial to find the starting-time of the following program on other pages, as the VPS-code of this program is not known. Therefore, it is impossible to find that page by using the procedure used to find the page with the current program. But the microcomputer can read the page number of the page with the current program. The following program has to be either on a rolling page with the same page number n or on a page with a page number n+1, which can also have rolling pages. The microcomputer can therefore make a page request with page number n and another with page number n+1 (step 400).

The microcomputer then has to wait for the next appearance of page n (step 410). If, in step 420, a determination is made that the next appearance of page n has the same content as its predecessor, the microcomputer concludes that there are no rolling pages under that page number and therefore the starting time of the following program is on a page with page number n+1 (checking the contents for correspondence is simply done by applying the search algorithm used to find the title of the current program to the next page n. If the search algorithm again finds the actual current program, it must be the same page and there are no rolling pages on that page number). In that case, the routine advances to step 440.

If there are rolling pages, the microcomputer simply selects the first starting-time with a valid VPS-time from the next page n. At step 430 a check is made to see if this is an earlier time than the starting-time of the current program, the following program has to be searched on page n+1. If so, the routine advances to step 440. Otherwise, the selected time is the starting-time of the next program, and the routine advances to step 480.

If the starting-time has to be searched on page n+1, the microcomputer also has to select the first starting-time with a valid VPS time. Should there be a difference between the end-time of the current program and the selected time (step 450), the microcomputer checks if there are rolling pages (step 460) and then selects the earliest time to display as starting-time of the next program (step 470).

Figure 5A:
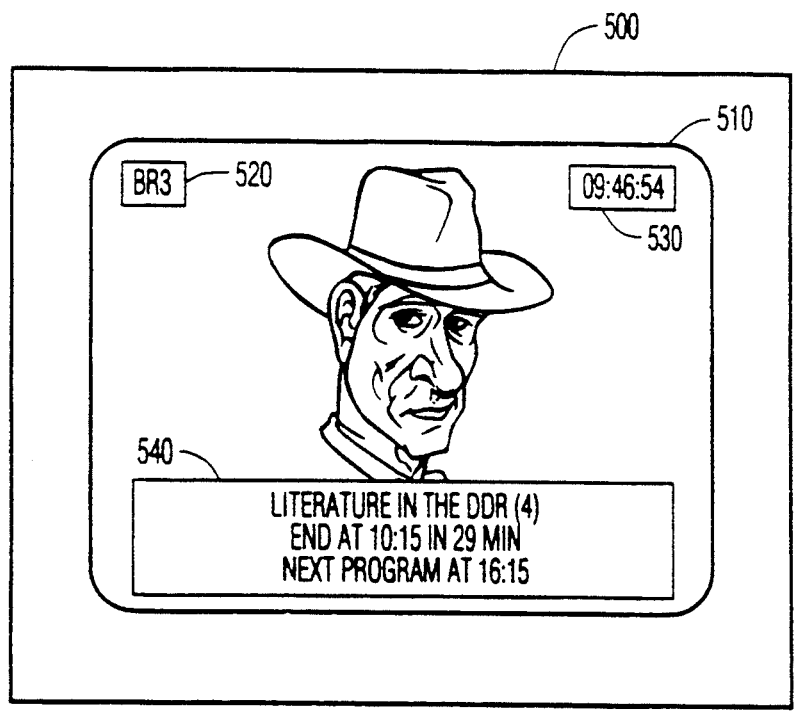
FIGS. 5a, and 5b show examples of program-related information displays.
Figure 5B:
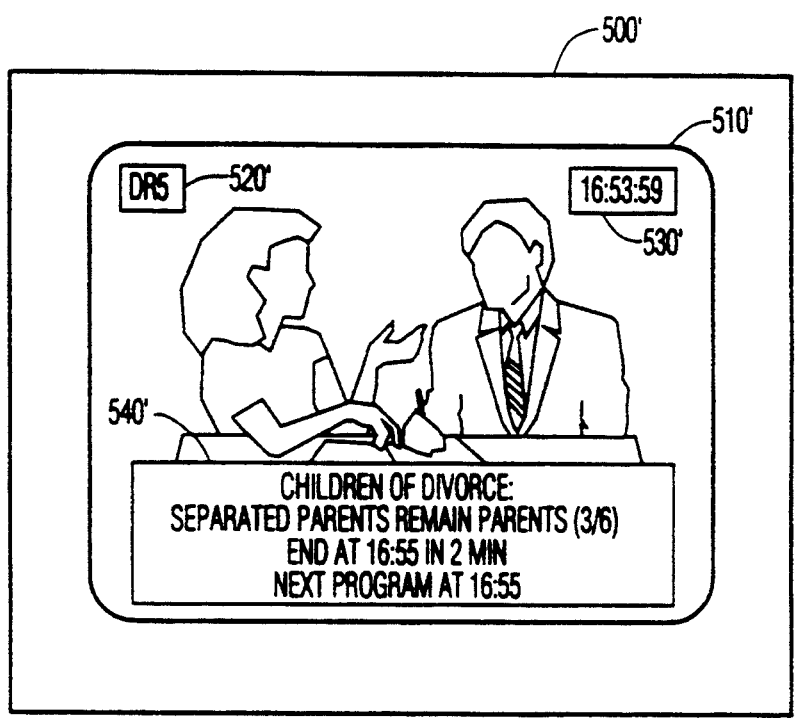

FIGS. 5a and 5b show examples of program-related information displays displayed on a screen 510, 510' of a television receiver 500, 500'. Current time of day is displayed (530, 530') as is station designation (520, 520')

The display (540, 540'), indicating the remaining duration, has to be updated during the time the microcomputer waits for the next appearance of pages, and if desired, the title of the following program can also be displayed.

When the microcomputer has found and displayed the starting time of the following program, it has to check if any changes occur on the program schedule pages. In this case the displayed information has to be updated. Normally this information is just displayed for a few seconds but updating is done in the background. Thus the information can be displayed on request immediately.

Thus has been described a program time display which is a useful feature for informing the TV viewer about the end of the current program. It is particularly helpful when changes or delays in the program schedule occur.

Its realization requires only modification of the software needed for displaying station name and program title as known from EP 89106255.6. The procedure for finding the relevant program pages in the incoming Teletext data stream is identical.

What is claimed is:

1. In a television signal processing system wherein the television signals include image representative information and a plurality of accompanying segments of supplementary information including program identification information, and a listing of program title information, program starting times, and program source information, the supplementary information being encoded during vertical blanking intervals of the broadcast signal with at least the program identification information being disposed within vertical blanking intervals of related image-representative information and further being included within said listing, signal processing apparatus comprising:

tuning means for selectively receiving television signals transmitted by individual program sources, the received signals including image-representative information and accompanying segments of supplementary information;

first signal decoder means for decoding said listing and said included program identification information;

memory means for storing and retrieving at least said program title information and included starting time information for the current program and starting time information for the next program decoded by said first signal decoder means;

a first controller means coupled to said first decoder means for selectively transferring said segments of supplementary information among said memory means, said first decoder means and said first controller means;

second signal decoder means for decoding said program identification information disposed within blanking intervals of related image-representative information;

said first controller means, upon initial reception of signals from an individual program source by said tuning means, sequentially causing said second signal decoder means to decode said program identification information accompanying related image-representative information, thereafter causing said first signal decoder means to identify the same program identification information within said listing and to store at least program title information of said listing in said memory means, said first controller means thereafter transferring said program title information from said memory means for display thereof along with related image-representative information;

said program identification information may appear on a page of data n of m pages of data, and may continue onto one of a second page also designated n and a further page designated n+1, said second signal decoder means searches said pages and decodes said program information to retrieve one of a) the starting time and ending time of the current program; and b) the starting time of the current program and the starting time of a subsequent program;

said first signal decoder thereafter deriving and displaying one of said ending time of the current program and the time remaining in the current program.

2. Signal processing apparatus according to claim 1 wherein said second page also designated n is a rolling page.

3. Signal processing apparatus according to claim 1 wherein said listing comprises teletext information and said first signal decoder means comprises a teletext decoder system.

4. Signal processing apparatus according to claim 3 wherein said second signal decoder means comprises a VPV or VPT decoder system.

5. Signal processing apparatus according to claim 3 wherein said first controller means provides first control signals to said first signal decoder means, upon initial reception of a running program, to cause said first signal decoder means to search teletext transmissions for program identification information matching corresponding information provided by said second signal decoder means.

6. Signal processing apparatus according to claim 5 wherein said second signal decoder means comprises a VPV or VPT decoder system.

7. Signal processing apparatus according to claim 5 wherein said first controller means transfers program source information, program starting time information and one of program ending time and time remaining in said current program, from said memory means for display along with said program title information.

8. A method of processing television signals wherein the television signals include image-representative information and a plurality of segments of accompanying supplementary information including program identification information having a time component, and a listing including program title information and program source information, the supplementary information being encoded during vertical blanking intervals of the television signal with at least the program identification information being disposed within vertical blanking intervals of related image-representative information and further being included within the listing, the method comprising:

tuning a television signal processor for selectively receiving signals transmitted by an individual program source, the received signals including said image-representative information and accompanying segments of supplementary information;

decoding said listing and said included program identification information;

storing said decoded listing and included program identification information for subsequent retrieval;

decoding said program identification information disposed within blanking intervals of related image-representative information;

comparing said last-named program identification information with said included program identification information to identify matching information; and displaying at least program title information accompanying said included identification information upon identifying matching program identification information;

searching for information on rolling pages and subsequent pages to derive ending time information for the current program by, reading again a page of data bearing the same designation as the previously-read page of data of said listing;

determining if said read-again page of data is the same as said previously-read page or a rolling page;

reading a subsequent page of data if said read-again page of data is the same as said previously-read page of data; and determining an ending time from one of an explicit ending time and the starting time of a subsequent program.

* * * * *